United States Patent
Martens et al.

(10) Patent No.: US 10,148,452 B2
(45) Date of Patent: Dec. 4, 2018

(54) APPARATUS ADAPTED FOR CONNECTING A HOME NETWORK WITH A SERVICE PROVIDER NETWORK

(71) Applicant: THOMSON LICENSING, Issy de Mounlineaux (FR)

(72) Inventors: Kristof Martens, Herent (BE); Paul Praet, Antwerp (BE); Jurgen Schoeters, Ranst (BE)

(73) Assignee: Thomson Licensing, Issy-les-Moulineaux (FR)

( * ) Notice: Subject to any disclaimer, the term of this patent is extended or adjusted under 35 U.S.C. 154(b) by 272 days.

(21) Appl. No.: 14/653,011

(22) PCT Filed: Dec. 18, 2013

(86) PCT No.: PCT/EP2013/077185
§ 371 (c)(1),
(2) Date: Jun. 17, 2015

(87) PCT Pub. No.: WO2014/096064
PCT Pub. Date: Jun. 26, 2014

(65) Prior Publication Data
US 2016/0020919 A1   Jan. 21, 2016

(30) Foreign Application Priority Data

Dec. 20, 2012  (EP) .................................... 12306638

(51) Int. Cl.
*H04L 12/28* (2006.01)
*H04L 12/64* (2006.01)
*H04L 29/06* (2006.01)

(52) U.S. Cl.
CPC ...... *H04L 12/2836* (2013.01); *H04L 12/6418* (2013.01); *H04L 65/608* (2013.01); *H04L 69/14* (2013.01); *H04L 69/18* (2013.01)

(58) Field of Classification Search
CPC ............. H04L 12/2836; H04L 12/6418; H04L 65/608
(Continued)

(56) References Cited

U.S. PATENT DOCUMENTS

| 6,243,753 | B1  |   | 6/2001 | Machin et al. |
|-----------|-----|---|--------|---------------|
| 2005/0190743 | A1 | * | 9/2005 | Marcu ..................... H04L 12/66 370/352 |

(Continued)

FOREIGN PATENT DOCUMENTS

| EP | 0841831 |   | 5/1998 |
|----|---------|---|--------|
| EP | 0841831 | A2 * | 5/1998 |
| JP | 2003091464 |   | 3/2003 |

OTHER PUBLICATIONS

Liu Etal: "An Adaptive Transport Framework for Web Services"; Oct. 13, 2008; IEEE; CSA; pp. 32-37.
Search Report dated Jan. 31, 2014.

*Primary Examiner* — Glenford Madamba
(74) *Attorney, Agent, or Firm* — Myers Wolin LLC (57) ABSTRACT

The apparatus is adapted for connecting a home network with a service provider network via a broadband connection for providing Internet services and comprises a media relay for receiving a data stream of the home network in accordance with a first protocol and sending the data stream in accordance with a second protocol to the service provider network for an outgoing connection, and vice versa for an incoming connection. The media relay comprises a media device interface for linking the media relay with the home network and for separating signaling data from the media data of the receiving data stream, a signaling switch for converting the signaling data in accordance with the first protocol to the signaling data in accordance with the second protocol, a media switch for converting the media data in accordance with the first protocol to the media data in accordance with the second protocol, and a network inter- (Continued)

face for linking the media relay with the service provider network and for combining the signaling data from the signaling switch and the media data from the media switch.

8 Claims, 8 Drawing Sheets

(58) Field of Classification Search
 USPC .......................................................... 709/230
 See application file for complete search history.

(56) References Cited

U.S. PATENT DOCUMENTS

2009/0003381 A1\* 1/2009 Shamilian ............... H04L 69/08
 370/467
2010/0002721 A1 1/2010 Eller et al.

\* cited by examiner

APPARATUS ADAPTED FOR CONNECTING A HOME NETWORK WITH A SERVICE PROVIDER NETWORK

This application claims the benefit, under 35 U.S.C. § 365 of International Application PCT/EP2013/077185, filed Dec. 18, 2013, which was published in accordance with PCT Article 21(2) on Jun. 26, 2014 in English and which claims the benefit of European patent application No. 12306638.3, filed Dec. 20, 2012.

TECHNICAL FIELD

The invention relates to the field of end-user devices, in particular to residential gateways operating via a broadband connection with a service provider network for providing Internet services.

BACKGROUND OF THE INVENTION

Residential gateways are widely used to connect devices in a home of a customer to the Internet or any other wide area network (WAN). Residential gateways use for example digital subscriber line (xDSL) technology that enables a high data rate transmission over copper lines, high-speed wireless communication or optical fiber broadband transmission systems. Home networks have become part of everyday life for many end users. A home network consists of a range of heterogeneous components which means that the home network is made up of different kinds of devices. All these devices need to communicate with each other and the Internet.

A generic residential gateway, as used for home networks, includes typically a microprocessor, a non-volatile memory, in which an operating system with software modules and applications is stored, and a volatile memory for the operation of the residential gateway. The operating system of the residential gateway is for example a LINUX operating system and a gateway-specific middleware, which represents an execution environment for the applications. The software modules provide for example a DSL modem function, a cable or an optical modem function, gateway and switching functions, FXS functions, VoIP functionality, and include a Wi-Fi node for a wireless operation and an Ethernet bridge.

A residential gateway has to manage therefore a multitude of different media streaming technologies and there is often a mismatch in the transport protocols between different media interactors. For example, VoIP (voice over Internet Protocol) uses RTP/RTCP (Real-time Transport Protocol/ RTP Control Protocol) packets, FXS/FXO (Foreign Exchange Service/Foreign eXchange Office) uses media samples coming from a DSP (digital signal processor), and answering machines use files that need to be played/stored, etc. Linking the different transport protocols from one type to another is often a complex and individual implementation.

US20050190743 discloses a residential gateway comprising a plurality of protocol handlers and a plurality of operation modules in communication with each of the protocol handlers. A first protocol handler is associated with a given customer protocol or service provider protocol and is configured to convert input signals in conformance with the associated protocol to a generic information format. A second protocol handler is further configured to convert information from the generic information format to output signals in conformance with a second, associated protocol. One of the operation modules connects the first protocol handler with the second protocol handler and is configured to perform a telecommunications operation using information in the generic information format.

SUMMARY OF THE INVENTION

The apparatus, which is adapted for connecting a home network with a service provider network via a broadband connection for providing Internet services, comprises a media relay for receiving a data stream of the home network in accordance with a first protocol and sending the data stream in accordance with a second protocol to the service provider network for an outgoing connection, and vice versa for an incoming connection. The media relay comprises a media device interface for linking the media relay with the home network and for separating signaling data from the media data of the receiving data stream, a signaling switch for converting the signaling data in accordance with the first protocol to the signaling data in accordance with the second protocol, a media switch for converting the media data in accordance with the first protocol to the media data in accordance with the second protocol, and a network interface for linking the media relay with the service provider network and for combining the signaling data from the signaling switch and the media data from the media switch.

In a further aspect of the invention, the signaling switch receives metadata and raw data of the media data from the media device interface, the media device interface generates metadata applicable to the media data for the media switch for an outgoing connection and the network interface uses metadata with the raw media data from the media switch to regenerate the media data for an outgoing connection, and vice versa for an incoming connection. The signaling switch receives the metadata and raw data of the media data from the media device interface. The media switch comprises in particular a multitude of different entry connection points and a multitude of different exit connection points for processing of data streams according to a multitude of different protocols. The metadata include in particular the kind of the first and the second protocol, and also the source and destination port numbers which are used by the media switch to define the type of conversion between the first and the second protocol, or to define that no conversion is necessary in case the first and the second protocol are the same. The port numbers are advantageously also used by the media switch for selecting a respective entry connection point and a respective exit connection point of the media switch.

The invention provides a multimedia streaming architecture that makes an abstraction of the media transport protocols to reduce complexity of the media switch, so that different types of end devices can be easily interconnected without the need to know what transport protocol is used at the other side.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

In the following description, an apparatus adapted for connecting a home network with a service provider network via a broadband connection for providing Internet services is described. For purposes of explanation, numerous specific details are set forth in order to provide a thorough understanding of preferred embodiments. It will be evident, however, to one skilled in the art that the present invention may be practiced without these specific details.

The apparatus is for example a residential gateway or a media gateway, a router, a switch or a set-top box, and includes in a preferred embodiment a microprocessor, a non-volatile memory, in which an operating system and applications are stored, and a volatile memory for the operation of the apparatus. The operating system of the apparatus is for example a LINUX operating system and a device-specific middleware, which represents a device execution environment. The device execution environment includes software components for providing in particular a DSL modem function, gateway and switching functions, FXS functions, VoIP functionality and Wi-Fi operation.

Figure 1:
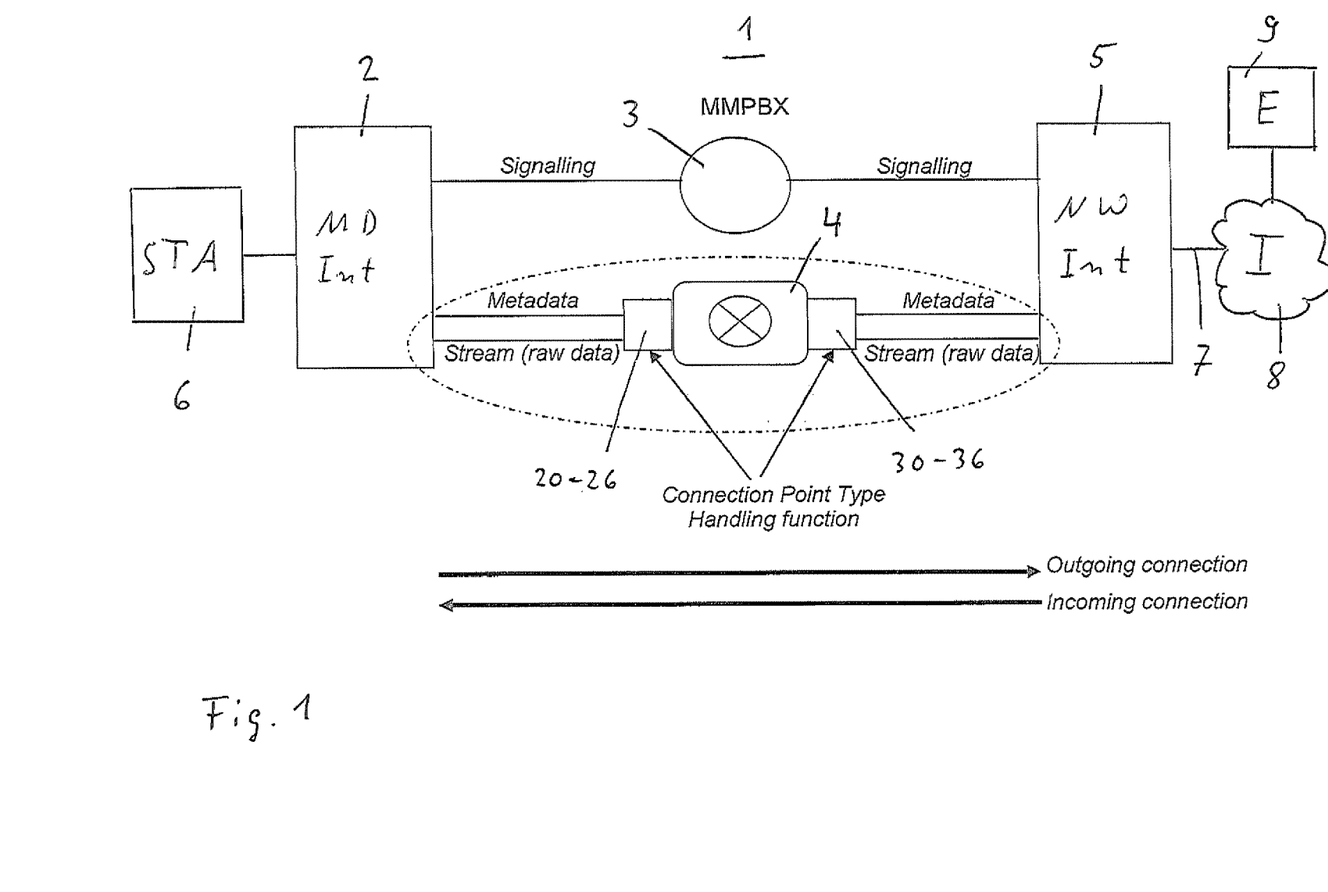
FIG. 1 a residential gateway for a home network, which includes a media relay with a media switch, FIG. 2 a media switch including a multitude of entry connection points and exit connection points, FIG. 3 an exemplary embodiment of the media switch of FIG. 2, and FIGS. 4-14 specific examples of the media switch of FIG. 2 having different connection point types and different conversions.

The apparatus includes a media relay 1, as shown in FIG. 1, which comprises a media device interface 2, a signaling switch 3, a media switch 4 and a network interface 5. The media relay 1 is linked via the media device interface 2 with an end device 6, for example a laptop, a tablet PC, a smartphone or a smart TV of a home network of a user. The apparatus acts in particular as a base station, e.g. as a residential gateway, within the home network and connects the home network with a service provider network 8 via a broadband connection 7, for example an xDSL or an optical fiber connection, for providing Internet services.

The media device interface 2 receives any media stream of the end device 6 including signaling data and media data, separates, if not separated yet, the signaling data from the media data of the receiving media stream and forwards the signaling data to the signaling switch 3 and the media data to the media switch 4. The network interface 5 receives any signaling data from the media switch and media data from the media switch 4 and combines any signaling data and the media data in accordance with a second protocol for the outgoing connection, and forwards the outgoing data stream via the broadband connection 7 and the service provider network 8, which is connected with the Internet or a part of the Internet, to any end device 9 of a second user.

In case of an incoming connection, e.g. from the end device 9, the media relay operates accordingly: the network interface 5 receives the data stream in accordance with a first protocol from the service provider network 8 and splits the signaling data from the media data of the receiving data stream. The signaling data are forwarded to the signaling switch 3 and the media data are forwarded to the media switch 4. The media device interface 2 receives the signaling data from the signaling switch 3 and the media data from the media switch 4. It combines the signaling data with a media data in accordance with a second protocol and forwards the respective data stream to the end device 6.

The media device interface 2 generates in particular also metadata from the media data to provide the metadata separate from the raw data to the media switch 4 for an outgoing connection. The raw data are the raw media data of the data stream, e.g. the audio and/or video data as included in the data stream. The metadata for the media data may be generated in accordance with the signaling data or based on recognizing the media data protocol. The network interface 5 handles correspondingly the metadata and the raw data, as received from the media switch 4. For an incoming connection, the metadata are generated from the media data by the network interface 5 and are combined by the media device interface 2 accordingly. The media switch 4 connects at least two connection points 20-26, 30-36 of same kind or of different kinds.

The metadata include the kind of the first and the second protocol, and also the source and destination port numbers of the connected devices, which port numbers are used by the media switch to define the type of conversion between the first and the second protocol, or to recognize that no conversion is necessary in case the first and the second protocol are the same.

Figure 2:
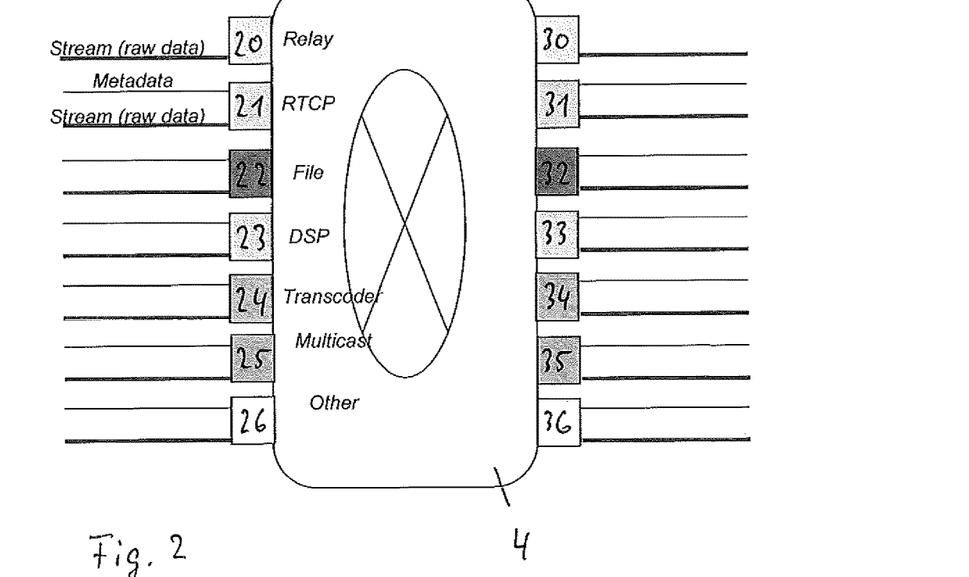

As shown in FIG. 2, the media switch 4 includes a multitude of connection points on an entry side and an exit side. Each of the connection points 20-26 and 30-36 can be an entry connection point or an exit connection point. The connection points 20-26 on one side of the media switch 4 are linked with the media device interface 2, and the connection points 30-36 are linked with the network interface 5. Each connection point has a specific functionality according to a particular media protocol type, which can be of a relay type for a connection of raw data, connection point 20, an RTP/RTCP (Real-time Transport Protocol/Real-time Transport Control Protocol) connection point 21, a file connection point 22, a DSP (digital signal processing) connection point 23, a transcoder connection point 24, a multicast connection point 25, or any other media connection point 26. Correspondingly, the media switch 4 includes the same kind of connection points at its other side, connection points 30-36.

Each connection point 20-26 receives from the media device interface 2 a raw media stream as well as some metadata describing the raw media stream as depending on the kind of protocol, when acting as an entry point, except for the relay connection point 20, which receives only a raw data stream without metadata. The connection points 30-36 are linked with the network interface 5 and are exit connection points, when the connection points 20-26 act as entry connection points. In the case when the connection points 30-36 act as entry connection points, then the connection point 21-26 act as corresponding exit connection points. The media switch 4 interconnects each entry connection point with an exit connection point such that one entry connection point is connected with one exit connection point of same type or of a different kind. The respective entry and exit connection point of the interconnection between any two devices is selected by the media switch 4 according to the metadata of the first and second protocol, e.g. the port numbers.

Figure 3:
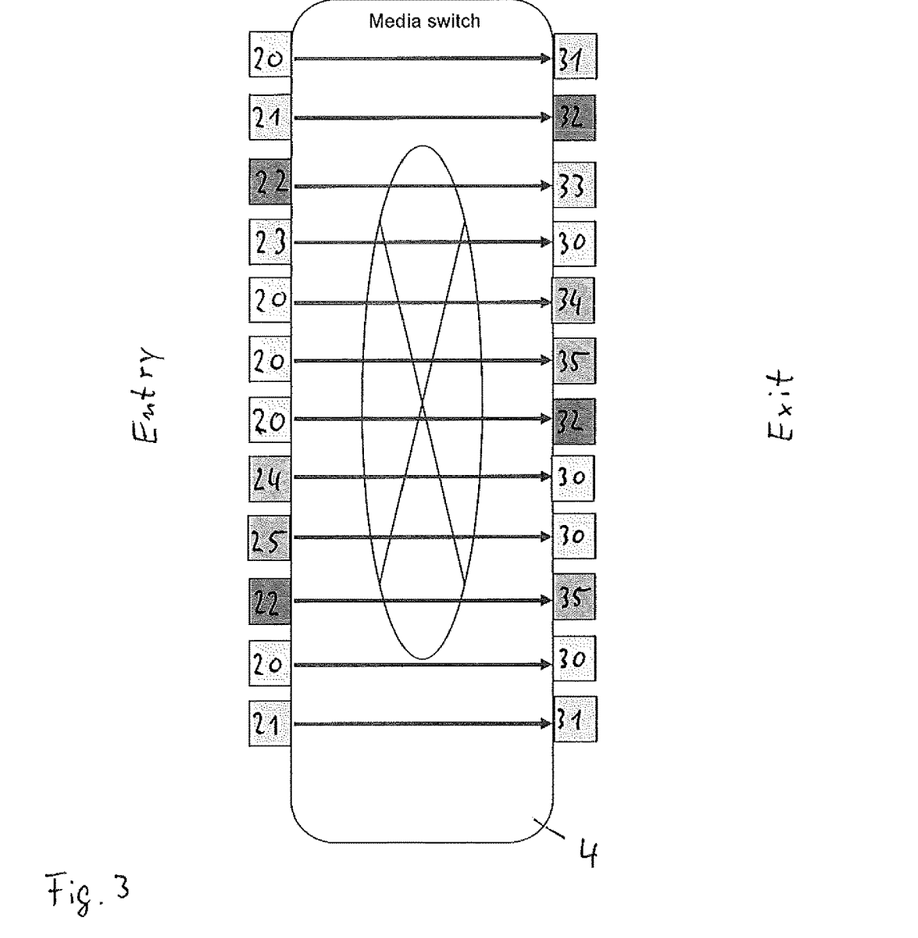

For an exemplary interconnection, the media switch 4 may be organized as shown in FIG. 3. An incoming raw data stream is received by a relay connection point 20 and switched by the media switch 4 to a RTP/RTCP exit connection point 31. An incoming data stream is received by a RTP/RTCP entry connection point 21 and switched by the media switch 4 to a file exit connection point 32. An incoming data stream is received by a file entry connection point 22 and switched by the media switch 4 to a DSP exit connection point 33. An incoming data stream is received by a DSP entry connection point 23 and switched by the media switch 4 to a relay exit connection point 30. An incoming raw data stream is received by a relay connection point 20 and switched by the media switch 4 to a transcoder exit connection point 34. An incoming raw data stream is received by a relay connection point 20 and switched by the media switch 4 to a multicast exit connection point 35, etc.

In the following figures, examples of media switches 4 are described in more detail having different connection point types and different conversions. Metadata with source and destination Internet addresses and source and destination port numbers of the source and destination end devices are also included in these figures. The examples do not show the transmission and conversion of the metadata, which are transmitted or converted in accordance with the incoming protocol and the outgoing protocol.

Figure 4:
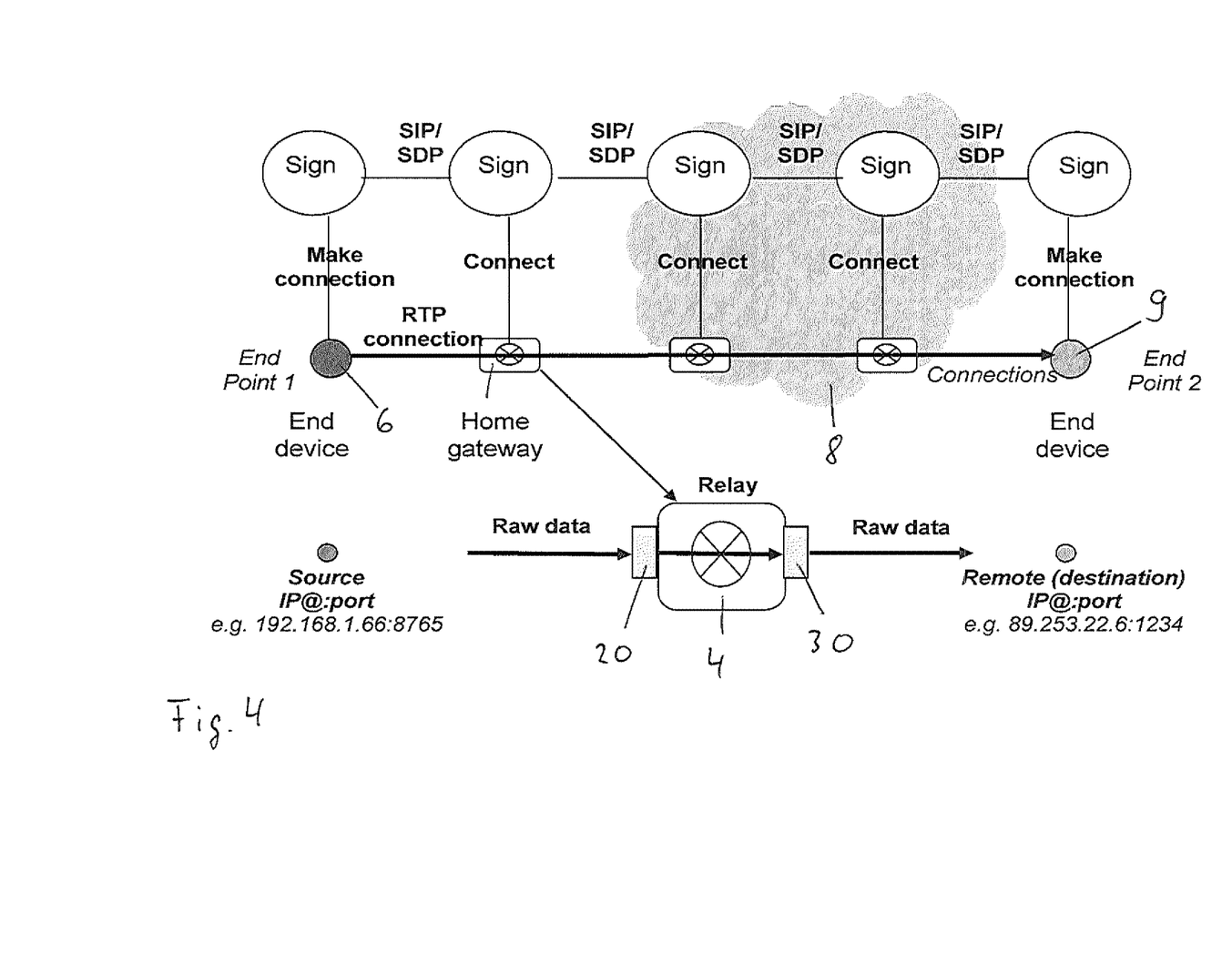
Figure 5:
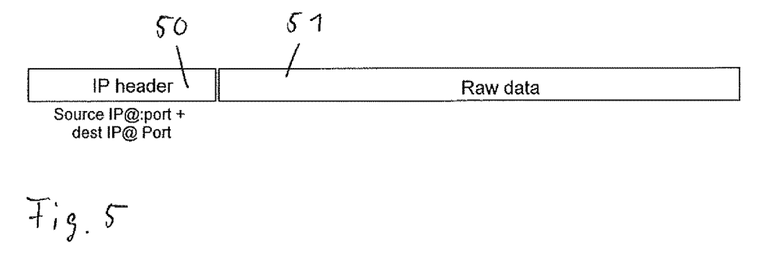

FIG. 4 shows a relay connection, which passes data whatever type, from an entry connection point 20 to an exit connection point 30. The residential gateway with the media switch 4 is a part of a home network including the end device 6, for example a laptop. The laptop sends a raw data stream via the home network and the Internet 8 to another end device 9, which can be e.g. also a laptop. The signaling is done for the data stream by using the SIP/SDP protocol. The IP packets sent by the media switch include an IP header 50 and the raw data packet 51, as shown in FIG. 5. The IP header includes the following metadata: source and destination Internet protocol addresses and the respective port numbers.

Figure 6:
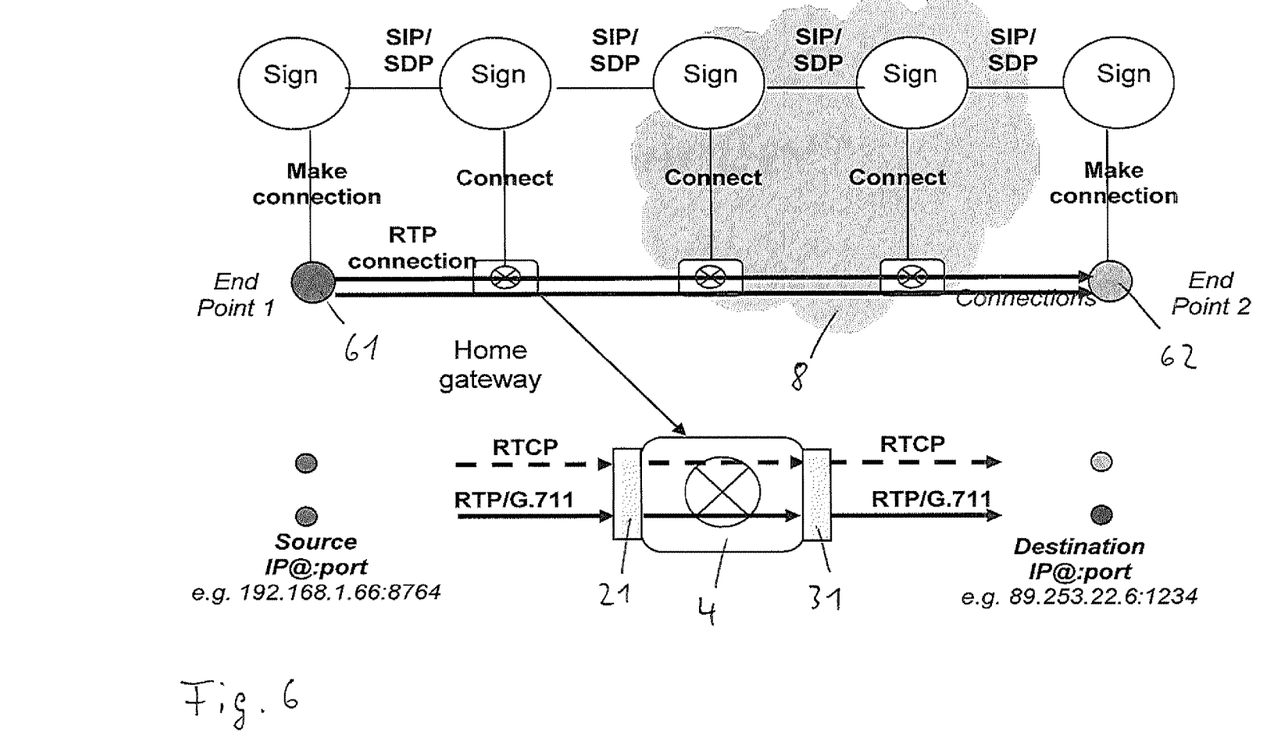
Figure 7:
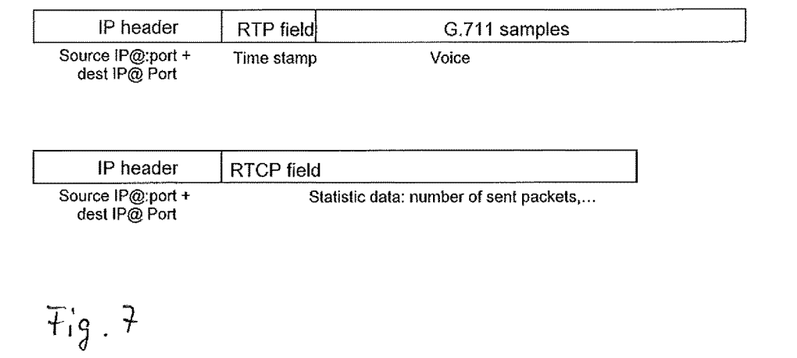

A residential gateway transmitting an RTP/RTCP stream from an end device 61 via the media switch 4 to an end device 62 is shown in FIG. 6. The RTP stream contains the media data, and the RTCP stream is optional and contains statistics, which are switched by the media switch from the RTP/RTCP entry connection point 21 to the RTP/RTCP exit connection point 31. The RTP/(RTCP) parameters in the metadata are: RTP source IP@:port info, RTP destination IP@:port info, (RTCP source IP@:port info), (RTCP destination IP@:port info), (RTCP bandwidth), (RTCP flag (RTCP sent or not)), and Media timeout informing that the media data=RTP stream are finished. The Internet RTP packet and the optional Internet RTCP packet look as shown in FIG. 7 (IP@=IP-address).

Figure 8:
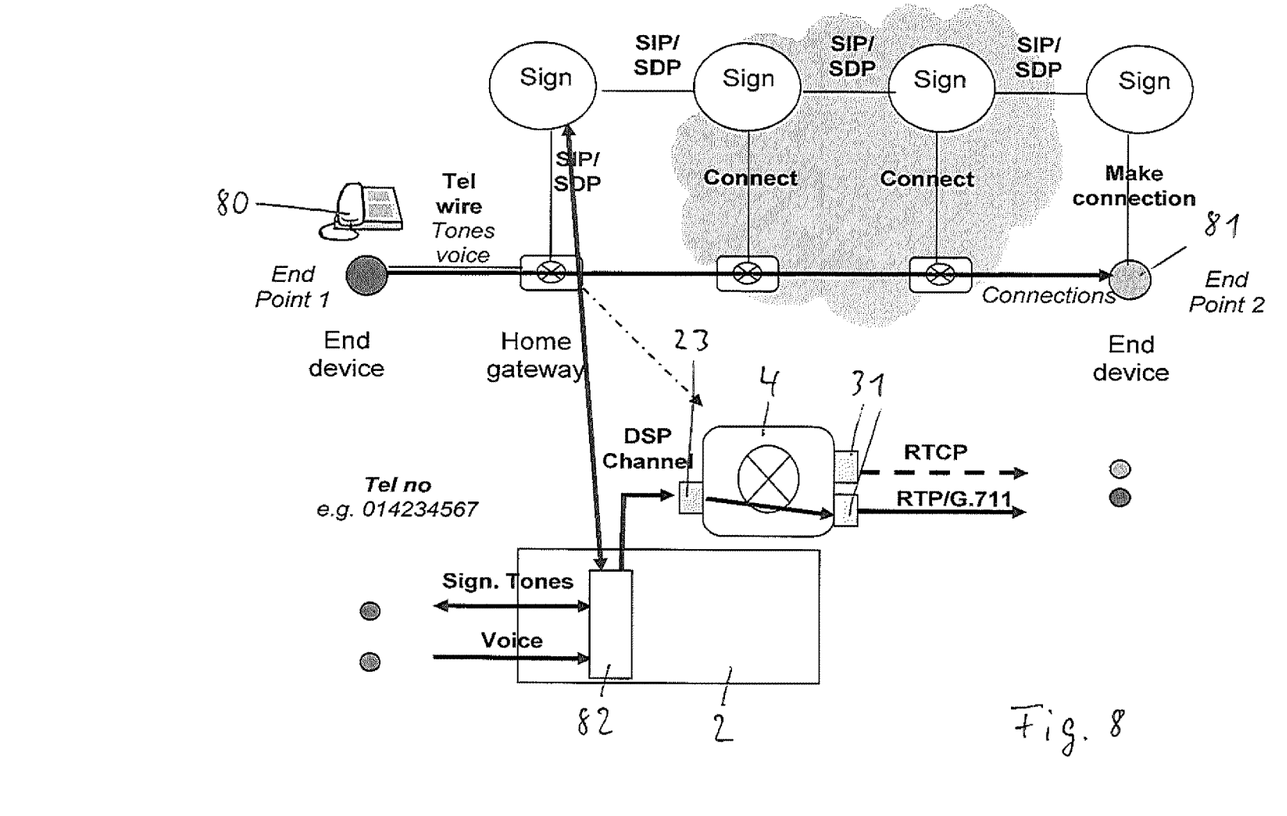

FIG. 8 shows an example, in which an FXS telephone call is converted by the media switch 4 to the RTP/RTCP protocol. A telephone 80 as an end device of the home network transmits signaling tones and a voice, e.g. for telephone number 014234567, to the home gateway, which transmits the telephone call via the Internet to another end device 81. In the media device interface 2, the signaling tones are separated from the analog voice signals and the signaling for the end device 81 is done via SIP/SDP. The media device interface 2 includes a kernel DSP 82 which converts the analog voice into a digital data stream, which is transmitted to the entry connection point 23 of the media switch 4. In the media switch 4, the DSP data stream is converted to the RTP/RTCP protocol and transmitted via the exit connection point 31 to the end device 81. Since the FXS port and the interface control is in lower layers, the voice stream is identified by the Kernel connection. The kernel parameters in the metadata are: DSP channel ID.

Figure 9:
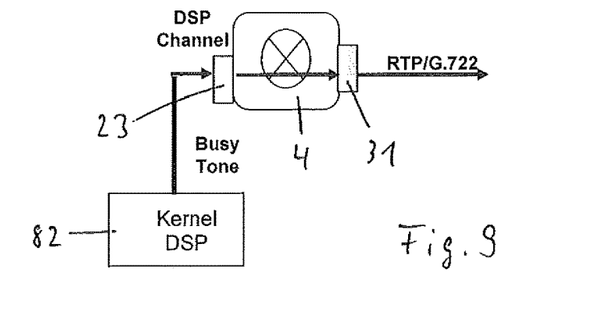

A tone locally stored in the residential gateway, for example a busy tone, is transmitted to an end device as shown in FIG. 9. The busy tone is transmitted by the kernel DSP 82 to the entry connection point 23 of the media switch 4, a DSP channel, which is transmitted via the RTP/RTCP exit connection point 31 to an end device. The Kernel parameters for the metadata are: DSP channel ID and tone ID.

Figure 10:
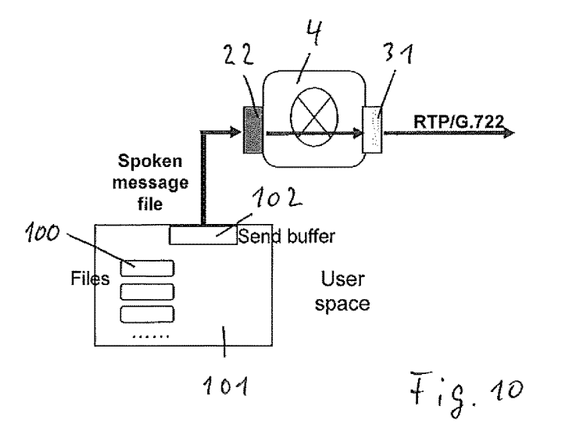

A message stored locally in the residential gateway is transmitted as shown in FIG. 10. The message is stored as a file 100 in the user space 101 of the residential gateway and transmitted via a send buffer 102 to the file entry connection point 22 and send via the RTP/RTCP exit connection endpoint 31 in accordance with the RTP protocol to an end device. The user space parameters are: file descriptor for read and where to read the file: file location, and send buffer size.

Figure 11:
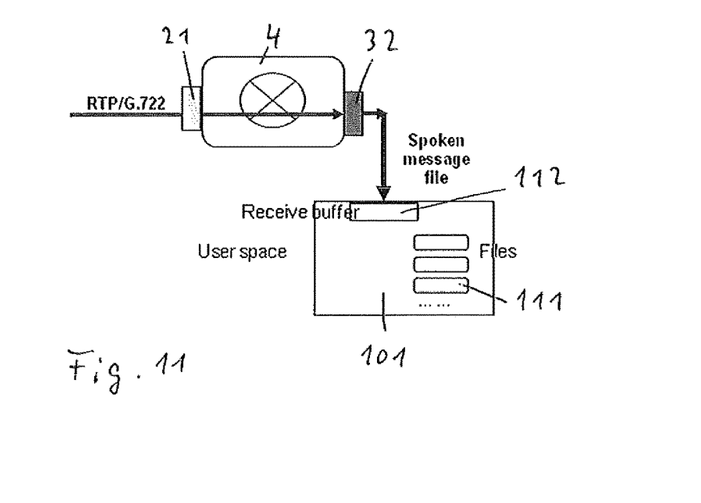

A message, which has to be stored locally in the residential gateway is processed accordingly, as shown in FIG. 11. The message is received via the RTP/RTCP entry connection point 21 and converted by the media switch 4 to a file and sent via the file exit connection point 32 to a receive buffer 112 of the user space 101, in which the file is stored as file 111. The user space parameters are in this embodiment the file descriptor for write and where to write the file: file location, and write buffer size.

Figure 12A:
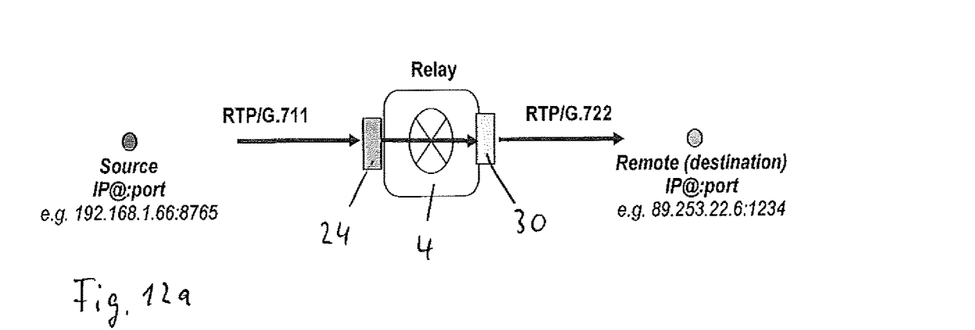
Figure 12B:
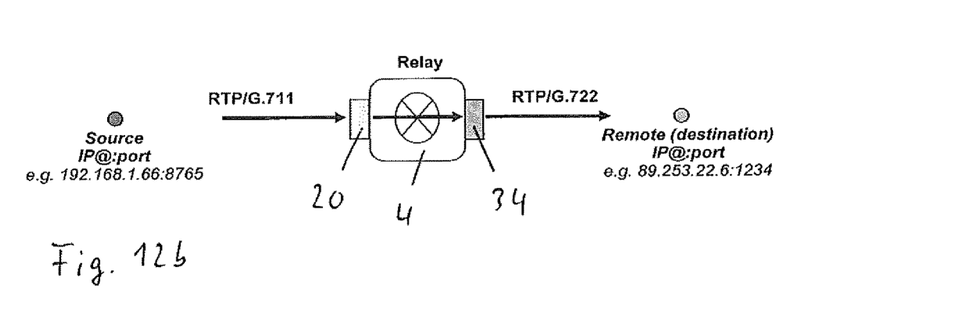

Transcoding of a data stream may be performed at the entry side of the media switch 4, as shown in FIG. 12a, or at the exit side of the media switch 4, as shown in FIG. 12b. In FIG. 12a, an RTP media stream in accordance with the G.711 protocol is transcoded at the transcoder entry connection point 24 into an RTP media stream in accordance with the G.722 protocol and linked by the media switch 4 to the relay exit connection point 20. FIG. 12b shows an RTP media stream in accordance with a G.711 protocol which is received at the relay entry connection point 20 and linked by the media switch 4 to the transcoder exit connection point 34.

Figure 13:
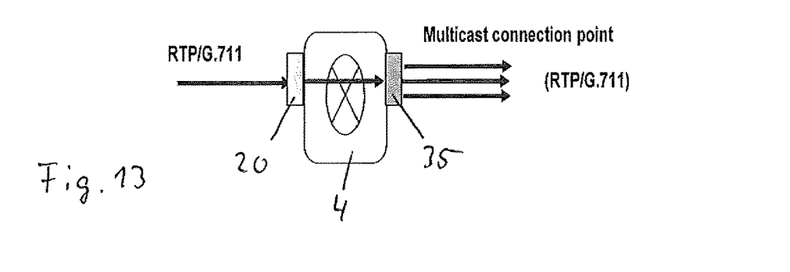

The function of the multicast exit connection point 35 is shown in FIG. 13. A RTP media stream in accordance with the G.711 protocol is received by the relay entry connection point 20 and linked by the media switch 4 to the multicast exit connection point 35. The multicast exit connection point 35 provides a multitude of RTP media streams in accordance with the G.711 protocol in this case.

Figure 14:
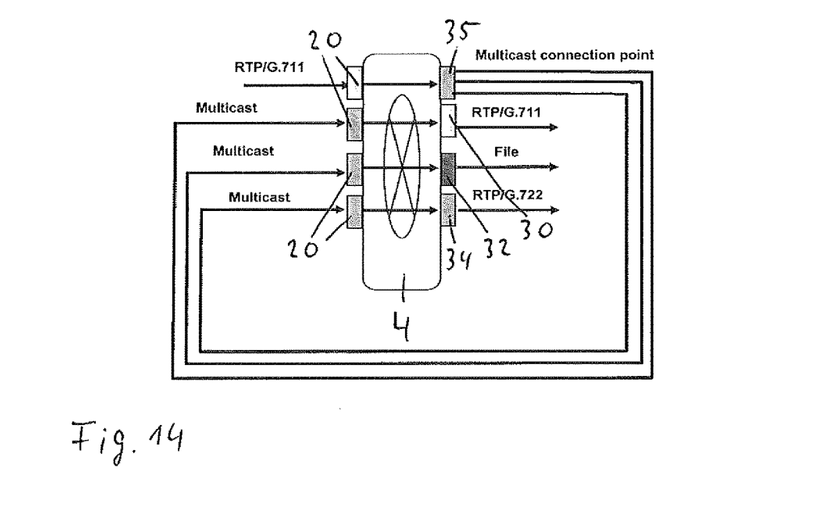

A multicast connection exit point of this kind is applied in an embodiment as shown in FIG. 14. An RTP G.711 media stream is received at the relay entry connection point 20, which is linked by the media switch 4 to the multicast exit connection point 35, which multiplies the RTP media stream into three RTP G.711 streams. The three RTP G.711 streams are each connected to a relay entry connection point 20 of the media switch 4. Each multicast entry connection point 20 is interconnected to an appropriate exit connection endpoint. In this embodiment, the first of the three streams is connected to a relay exit connection point 30 providing an RTP G.711 media stream, the second to a file exit connection point 32, for example for a recording of a voice entry, and the third to the transcoder exit connection point 34, which transcodes the RTP G.711 media stream into an RTP G.722 media stream.

The main advantage of the invention is that any media generators no longer need to care about the transport protocol that is being used at the receiving side of the media switch 4 and vice versa. This will lead to a simple architecture that can be easily extended to allow for many new scenarios with only limited modifications. This approach leads to an optimal implementation that will be very efficient with only very little delays. In terms of operating systems, this media handling can be done in the scope of kernel worker threads that can be prioritized as wanted to optimize the routing latency.

Also other embodiments of the invention may be utilized by one skilled in the art without departing from the scope of the present invention. The invention is in particular not limited to residential gateways using xDSL transmissions and is applicable also to any other wired or wireless broadband technology, and may be used accordingly for all kinds of apparatuses. The invention resides therefore in the claims herein after appended.

The invention claimed is:

1. An apparatus adapted for connecting a home network with a service provider network via a broadband connection for providing Internet services, wherein the apparatus comprises:
   at least one microprocessor;
   at least one memory;
   a media relay for receiving a data stream of the home network in accordance with a first protocol and sending the data stream in accordance with a second protocol to the service provider network for an outgoing connection, and vice versa for an incoming connection, wherein the media relay comprises:
      a media device interface for linking the media relay with the home network and for separating signaling data from the media data of the receiving data stream,
      a signaling switch for converting the signaling data in accordance with the first protocol to signaling data in accordance with the second protocol,
      a media switch including a multitude of entry connection points and exit connection points for converting the media data in accordance with the first protocol to media data in accordance with the second protocol, and
      a network interface for linking the media relay with the service provider network and for combining the signaling data from the signaling switch and the media data from the media switch, wherein
   the media device interface generates metadata from the media data to provide the metadata separate from the raw data to the media switch,
   the media switch receives the metadata and the raw data from the media device interface and selects an entry connection point and an exit connection point according to the metadata of the first and the second protocol, and
   the network interface is adapted to use the metadata with the raw data from the media switch to regenerate the media data for an outgoing connection.

2. The apparatus according to claim 1, wherein the media switch comprises a multitude of different entry connection points and a multitude of different exit connection points, and wherein the metadata include source and destination port numbers used by the media switch for selecting each one of the entry and exit connection points and/or parameters for defining any conversion of the data stream between the first and the second protocol.

3. The apparatus according to claim 2, wherein the apparatus is a residential gateway, an enterprise gateway or a media gateway, a set-top box, a mobile computer or a smart phone.

4. The apparatus according to claim 2, wherein the metadata include the kind of the first and the second protocol, and/or parameters for handling the media data.

5. The apparatus according to claim 1, wherein the media switch comprises a relay connection point for a connection of raw data, an RTP/RTCP (Real-time Transport Protocol/Real-time Transport Control Protocol) connection point, a file connection point, a DSP (digital signal processing) connection point, a transcoder connection point, and/or a multicast connection point.

6. The apparatus according to claim 5, wherein each of the connection points can be an entry connection point or an exit connection point.

7. The apparatus according to claim 1, wherein the apparatus is a residential gateway, an enterprise gateway or a media gateway, a set-top box, a mobile computer or a smart phone.

8. The apparatus according to claim 1, wherein the metadata include the kind of the first and the second protocol, and/or parameters for handling the media data.

* * * * *